United States Patent
Lai et al.

(10) Patent No.: US 11,120,069 B2
(45) Date of Patent: Sep. 14, 2021

(54) GRAPH-BASED ONLINE IMAGE QUERIES

(71) Applicant: International Business Machines Corporation, Armonk, NY (US)

(72) Inventors: Jui-Hsin Lai, White Plains, NY (US); Ching-Yung Lin, Scarsdale, NY (US); Lifeng Nai, Atlanta, GA (US); Yinglong Xia, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 15/215,864

(22) Filed: Jul. 21, 2016

(65) Prior Publication Data
US 2018/0025031 A1    Jan. 25, 2018

(51) Int. Cl.
*G06F 16/51* (2019.01)
*G06F 16/583* (2019.01)
*G06F 16/58* (2019.01)

(52) U.S. Cl.
CPC .............. *G06F 16/51* (2019.01); *G06F 16/58* (2019.01); *G06F 16/583* (2019.01)

(58) Field of Classification Search
USPC ........................................................ 707/723
See application file for complete search history.

(56) References Cited

U.S. PATENT DOCUMENTS

| | | | |
|---|---|---|---|
| 5,485,611 A | 1/1996 | Astle | |
| 7,917,286 B2 | 3/2011 | Taylor | |
| 7,945,576 B2 | 5/2011 | Brown | |
| 8,073,287 B1 | 12/2011 | Wechsler | |
| 8,407,029 B2 | 3/2013 | McAuley et al. | |
| 8,971,641 B2 | 3/2015 | Buchmueller et al. | |
| 2004/0204925 A1 | 10/2004 | Alon et al. | |
| 2010/0209008 A1* | 8/2010 | Chertok et al. | G06F 16/5854 707/741 |
| 2011/0286628 A1 | 11/2011 | Goncalves | |
| 2014/0147000 A1 | 5/2014 | Wu | |
| 2015/0317537 A1* | 11/2015 | Jain | G06T 7/0012 382/128 |

(Continued)

FOREIGN PATENT DOCUMENTS

CN    102306287    1/2012

OTHER PUBLICATIONS

StatTrek: Teach Yourself Statistics http://stattrek.com/tutorials/statistics-tutorial.aspx, accessed Jan. 9, 2016, selected pp. 1, 3, 5, 7-8, 11.

(Continued)

*Primary Examiner* — Muluemebet Gurmu
(74) *Attorney, Agent, or Firm* — Daniel Morris; Otterstedt, Wallace & Kammer, LLP

(57) ABSTRACT

A query image is obtained. In a database including a plurality of reference image graphs, at least one of the reference image graphs, with feature vectors similar to the query image, is identified. Image querying is carried out by graph traversal on the at least one of the reference image graphs with the feature vectors similar to the query image. An image from the at least one of the reference image graphs having a highest matching score in the graph traversal is returned as a response to the query image. techniques for building the database are also disclosed.

17 Claims, 16 Drawing Sheets

(56) References Cited

U.S. PATENT DOCUMENTS

2015/0363461 A1 12/2015 Behal et al.
2016/0125308 A1* 5/2016 Bohne et al. .......... G06N 99/00
                                                  706/12

OTHER PUBLICATIONS

Wikipedia, Standard deviation. https://en.wikipedia.org/wiki/Standard_deviation, accessed Jan. 9, 2016, first section converted to PDF Jan. 9, 2016, pp. 1-2.

Wikipedia, Gaussian function. https://en.wikipedia.org/wiki/Gaussian_function, accessed Jan. 9,2016, first section converted to PDF format on Jan. 9, 2016. pp. 1-2.

Xia et al., "Concurrent Image Query Using Local Random Walk with Restart on Large Scale Graphs", (ICMEW), 2014 IEEE, pp. 1-7, presented Jul. 14-18, 2014.

Panu Turcot and David G. Lowe. Better matching with fewer features: The selection of useful features in large database recognition problems. Computer Vision Workshops (ICCV Workshops), 2009 IEEE 12th International Conference on Sep. 27, 2009-Oct. 4, 2009. pp. 2109-2116.

James Philbin et al, Object retrieval with large vocabularies and fast spatial matching. 2007 IEEE Conference on Computer Vision and Pattern Recognition. Jun. 17-22, 2007. pp. 1-8.

Zdenek Kalal et al, Online learning of robust object detectors during unstable tracking. 2009 IEEE 12th International Conference on Computer Vision Workshops, ICCV Workshops, Sep. 27, 2009-Oct. 4, 2009, pp. 1417-1424.

Zdenek Kalal et al, P-N Learning: Bootstrapping Binary Classifiers by Structural Constraints. Computer Vision and Pattern Recognition (CVPR), 2010 IEEE Conference on Jun. 13-18, 2010. pp. 49-56.

Boris Babenko et al, Robust Object Tracking with Online Multiple Instance Learning. IEEE Transactions on Pattern Analysis and Machine Intelligence, vol. 33, No. 8, Aug. 2011. pp. 1619-1632.

Ian Simon et al, Scene Summarization for Online Image Collections. Conference Paper in Proceedings / IEEE International Conference on Computer Vision. IEEE International Conference on Computer Vision—Nov. 2007, pp. 1-8.

Song Cao and Noah Snavely. Learning to Match Images in Large-Scale Collections. Proceeding ECCV'12 Proceedings of the 12th international conference on Computer Vision—vol. Part I pp. 259-270, 2012.

Barbara Poblete et al. Visual-Semantic Graphs: Using Queries to Reduce the Semantic Gap in Web Image Retrieval. CIKM'10, Oct. 26-30, 2010, Toronto, Ontario, Canada. pp. 1553-1556.

James Philbin et al, Geometric Latent Dirichlet Allocation on a Matching Graph for Large-scale Image Datasets. INt. J. Comp. Vis., Springer, Jun. 15, 2010. pp. 1-16.

Jui-Hsin (Larry) Lai, Object Tracking with Instance Matching and Online Learning, self-published online, pp. 1-4, downloaded from http://larrylai.org/tracking.html on Jul. 11, 2016.

* cited by examiner

GRAPH-BASED ONLINE IMAGE QUERIES

BACKGROUND

The present disclosure relates to image processing and databases.

Image-query is a kernel computation for many emerging applications, including security (e.g., analysis of surveillance videos); mobile technologies (e.g., scene recognition on a smartphone; cloud computing (e.g., image and/or video search applications); and the like.

SUMMARY

Embodiments of the present disclosure provide techniques for graph-based online image queries.

In one aspect, an exemplary method for is provided that includes obtaining a query image; in a database including a plurality of reference image graphs, identifying at least one of the reference image graphs with feature vectors similar to the query image; carrying out image querying by graph traversal on the at least one of the reference image graphs with the feature vectors similar to the query image; and returning, as a response to the query image, an image from the at least one of the reference image graphs having a highest matching score in the graph traversal.

In another aspect, an exemplary system for includes a plurality of hardware servers; a database application executing in a workload layer on top of the plurality of hardware servers; and a network interface in data communication with the database application. The database application obtains a query image over the network interface; the database application includes a plurality of reference image graphs, and identifies at least one of the reference image graphs with feature vectors similar to the query image; the database application carries out image querying by graph traversal on the at least one of the reference image graphs with the feature vectors similar to the query image; and the database application returns, as a response to the query image, via the network interface, an image from the at least one of the reference image graphs having a highest matching score in the graph traversal.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

real time image querying, which can (but need not) be carried out on commodity infrastructure, ability to handle dynamics of the underlying problems, ability to handle concurrent operations, improve functioning of a computing system, such as a cloud computing system, by speeding up image-based querying.

These and other features and advantages of the present invention will become apparent from the following detailed description of illustrative embodiments thereof, which is to be read in connection with the accompanying drawings.

DETAILED DESCRIPTION

Figure 1:
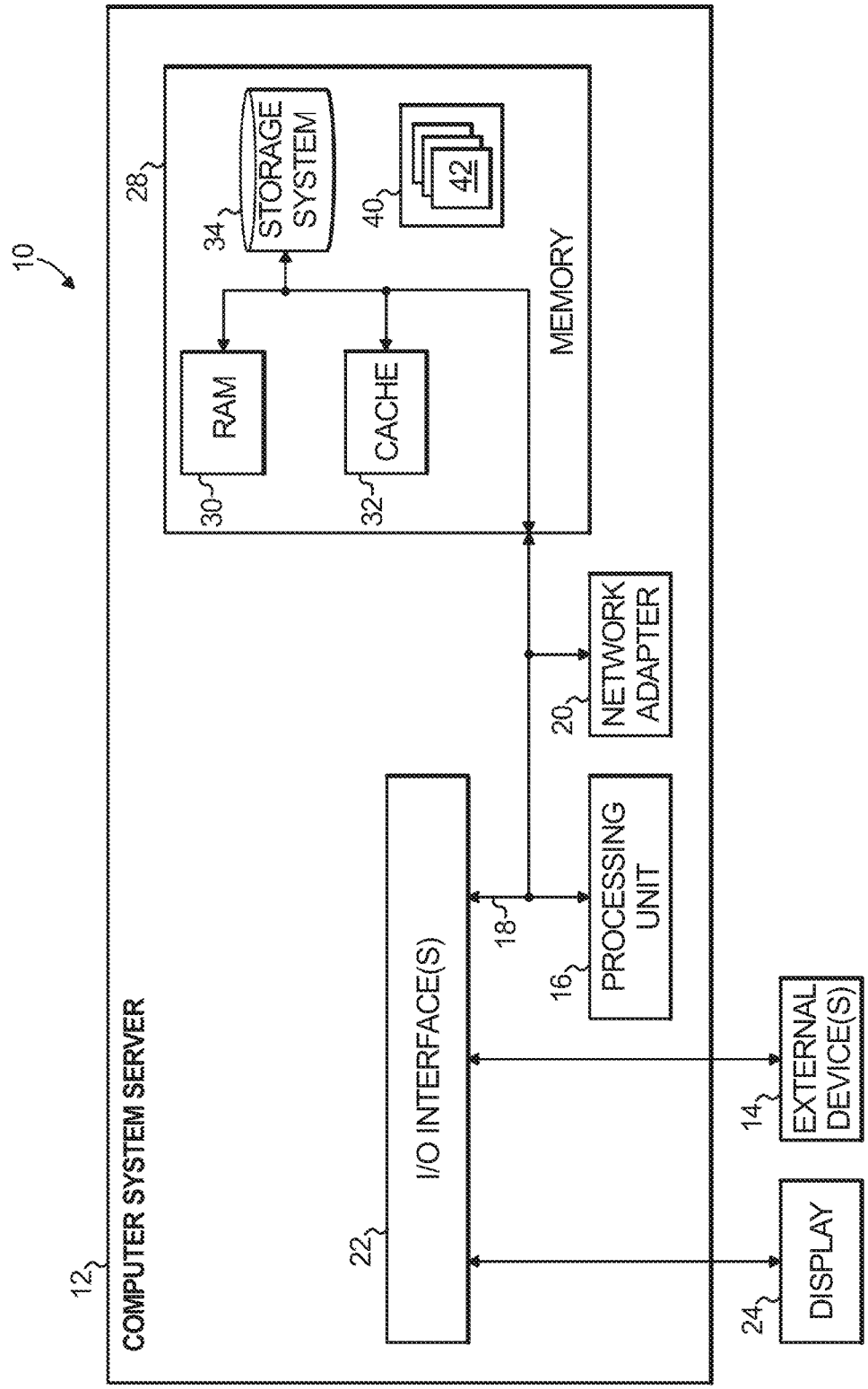
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
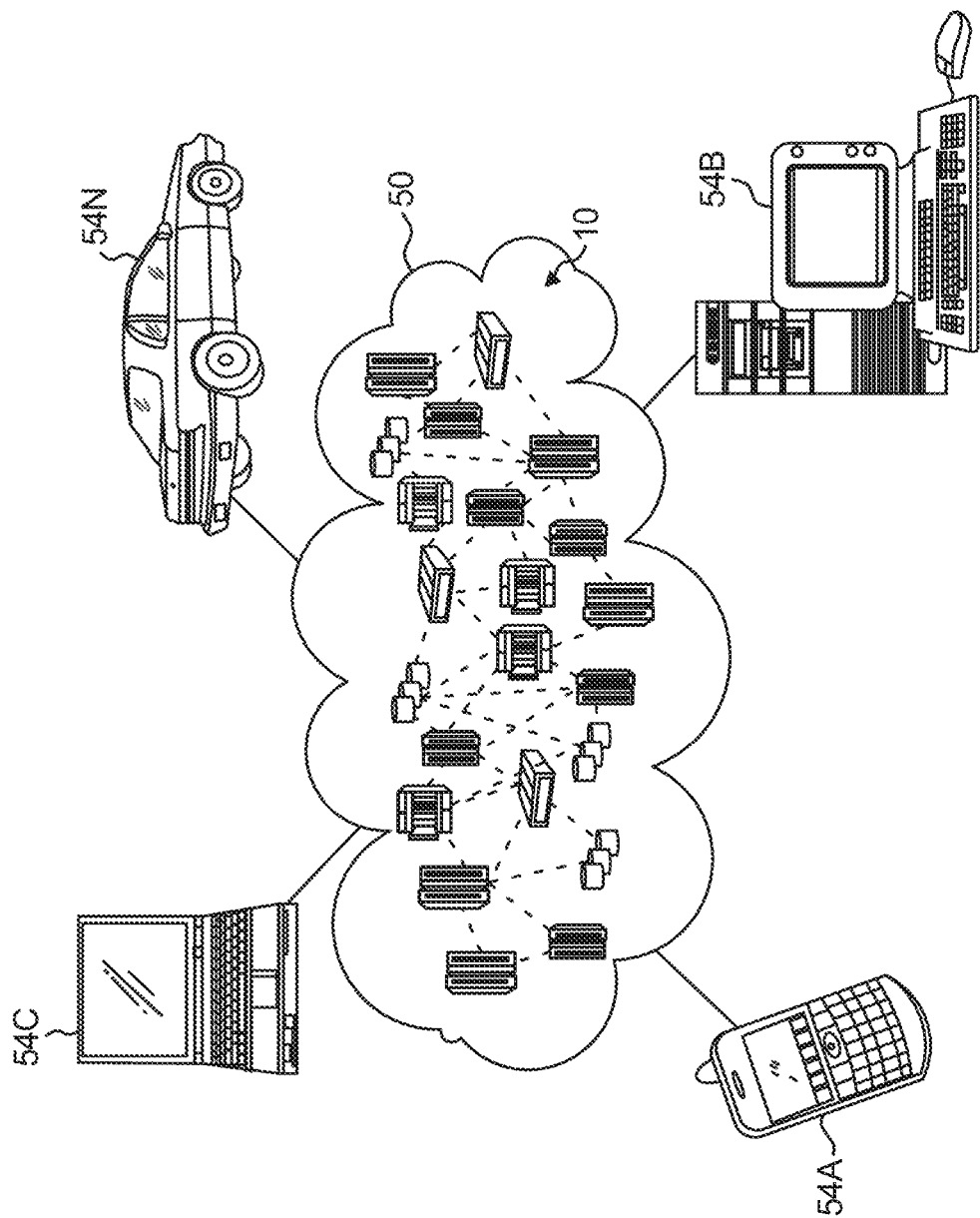
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
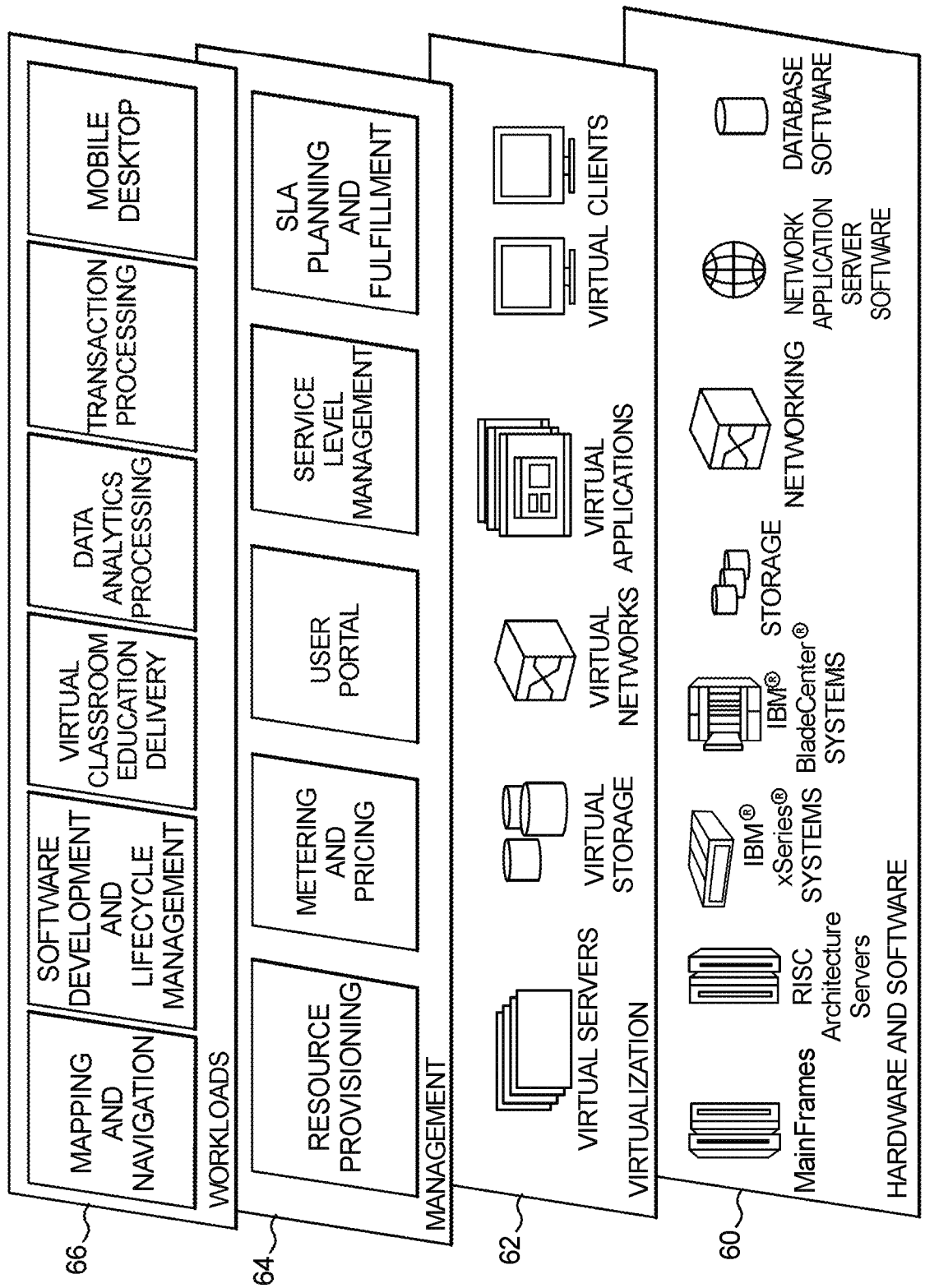
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted, image-query is a kernel computation for many emerging applications, including security (e.g., analysis of surveillance videos); mobile technologies (e.g., scene recognition on a smartphone; cloud computing (e.g., image and/or video search applications); and the like.

There are a number of challenges in applications to big data and/or online systems. Such applications are dynamic—new images are uploaded to the database every second, it is challenging to build the image database online, and the image database has a dynamic structure. Efficiency is also a challenge. In order to provide a real-time, immediate response to an image-query, an efficient database structure is needed, and it is desirable to reduce the computation time in each image-query. Parallelism is also desirable, such that multiple queries can be carried out at the same time. In this regard, the database structure should be suitable for parallel query, and the system should maintain high performance under parallel querying.

Figure 4:
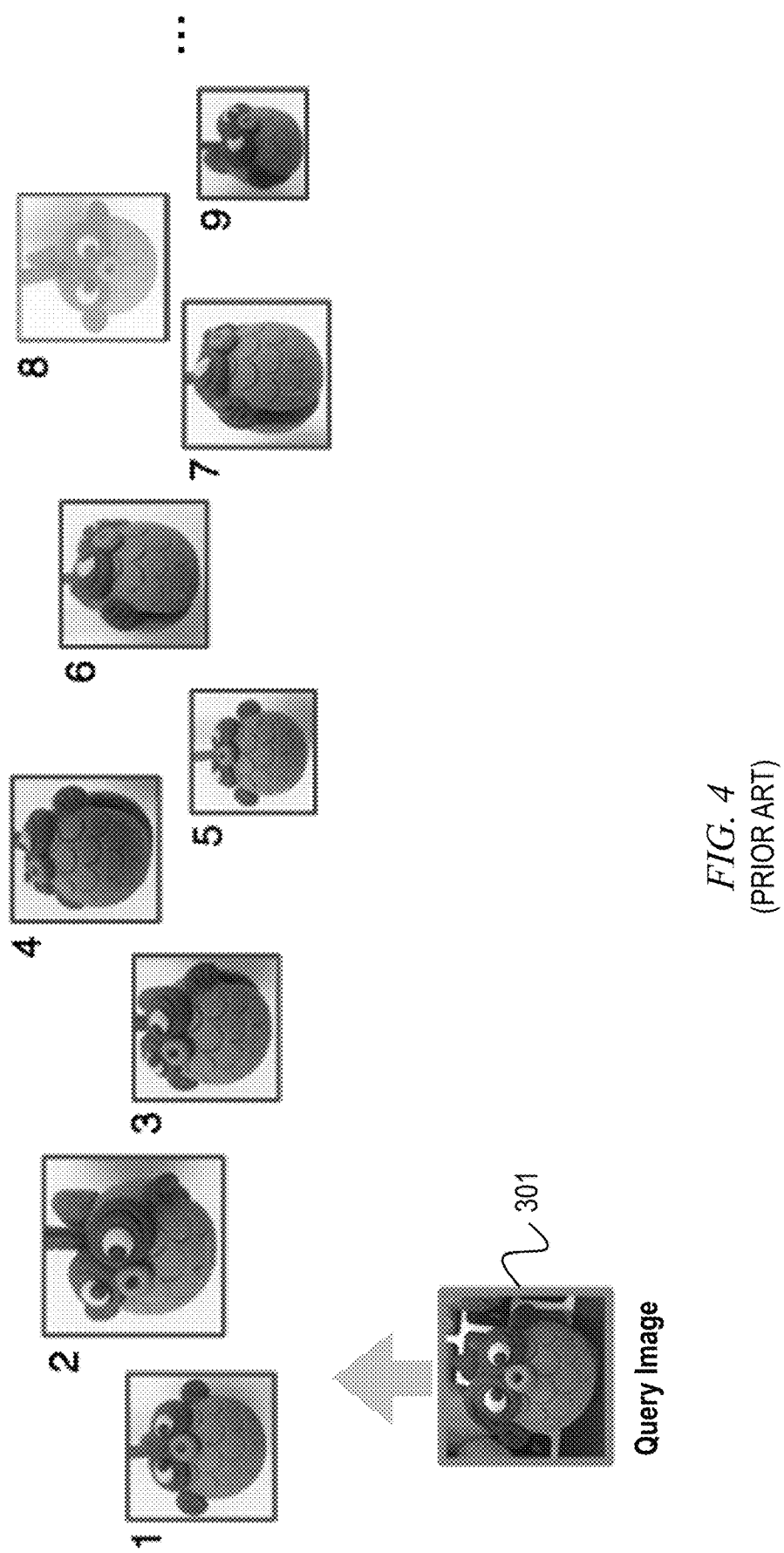
FIG. 4 depicts images in a database sorted with a time index, as known from the prior art.

Some existing solutions employ a time stamp approach, as seen in FIG. 4. Images in the database are sorted with a time index (here, 1 through 9), and successive images are uploaded and allocated close indices or labels. The index or label is taken as a surrogate for being close in time. Furthermore in this regard, in general, files in database are stored with an index or label. When adding a new file to a database, the file will have an index such as, for example, k. The next new file will have an index k+1. The file index or label can be treated as a sorting by time. "Close" means that the difference of index or label of two files is small, and thus they are assumed to be close in time as well. While such a database is easy to build, comprehensive search on the query image 301 is inefficient for image querying.

Figure 5:
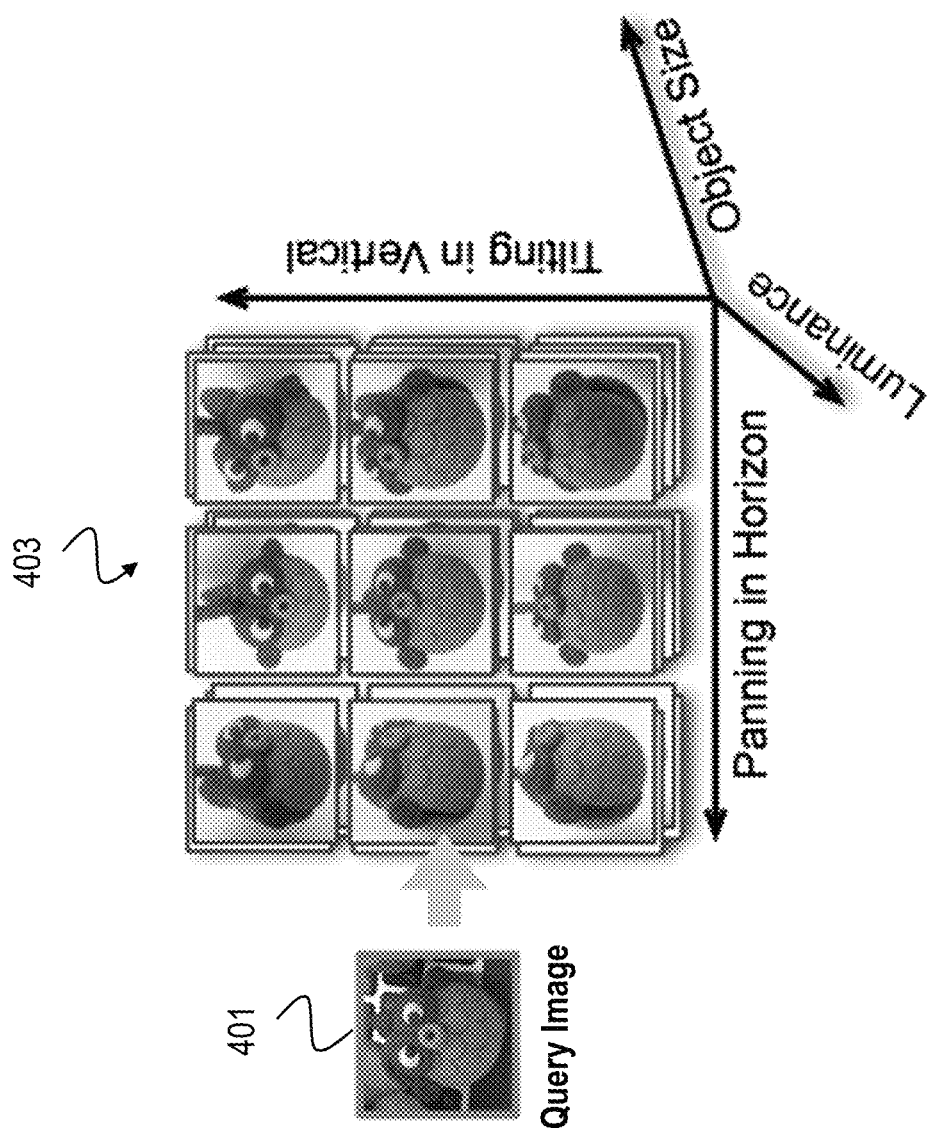
FIG. 5 depicts images in a database clustered with vectors, wherein images with similar feature vectors are in one group, as known from the prior art.

Other existing solutions employ a feature vector approach, as seen in FIG. 5. Images 403 in the database are clustered with vectors, and images with similar feature vectors are in one group. Feature vectors can include, for example, object orientation (e.g., tilting in the vertical, panning in the horizontal), luminance value, object size, and the like. Querying is on the query image 401. While such a database is more efficient for image-query than the time stamp approach, it is impractical if there are many images in one vector space. Refer to Jui-Hsin (Larry) Lai, Object Tracking with Instance Matching and Online Learning, self-published online, expressly incorporated herein by reference in its entirety for all purposes.

Figure 6:
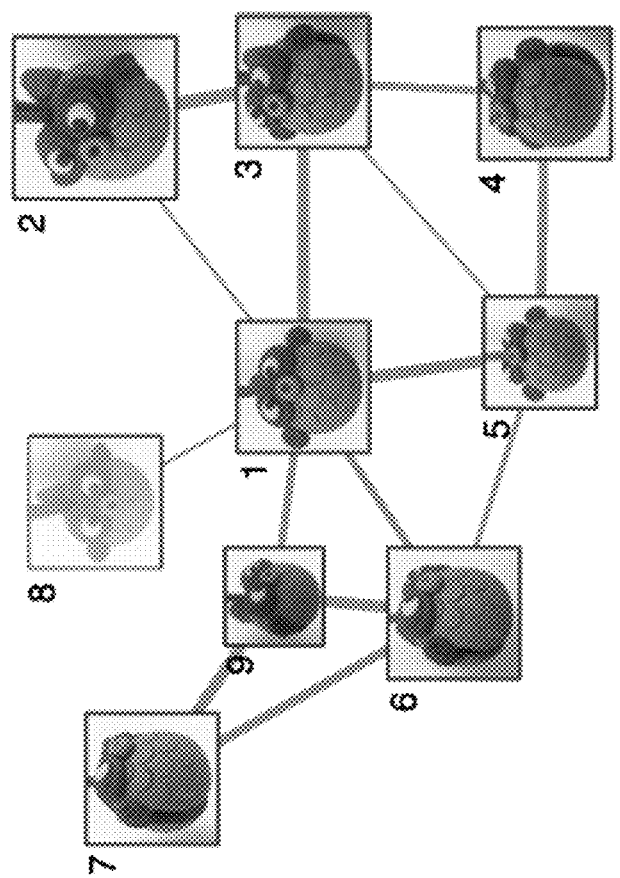
FIG. 6 depicts a graph-based image database, according to an embodiment of the present invention.

Referring to FIG. 6, one or more embodiments employ a graph-based image database, wherein the image relationship is recorded in a graph structure and only reference images are kept in the database. A Reference Image Graph (RIG) includes a group of images 1-9 with similar feature vectors, the links (not separately numbered in FIG. 6) connecting two images by image similarity, with selection of "reference images" to build an image graph. Image similarity may be ascertained, for example, by identical features, geographic matching (GPS location matching, e.g., using the Global Positioning System (GPS) or other space-based navigation system), and/or visual sentiment. This approach is more efficient for image querying, even in a big data environment; however, in at least some embodiments, this efficiency comes at the cost of moderately increased computational effort in building the database. Note that the indices 1-9 in FIG. 6 are also index numbers for records in the database—comparison to FIG. 4 is fruitful—the location of the index numbers in FIG. 6 vs. FIG. 4 shows a comparison between the graph structure (according to one or more embodiments of the invention) and time series (prior art).

Figure 7:
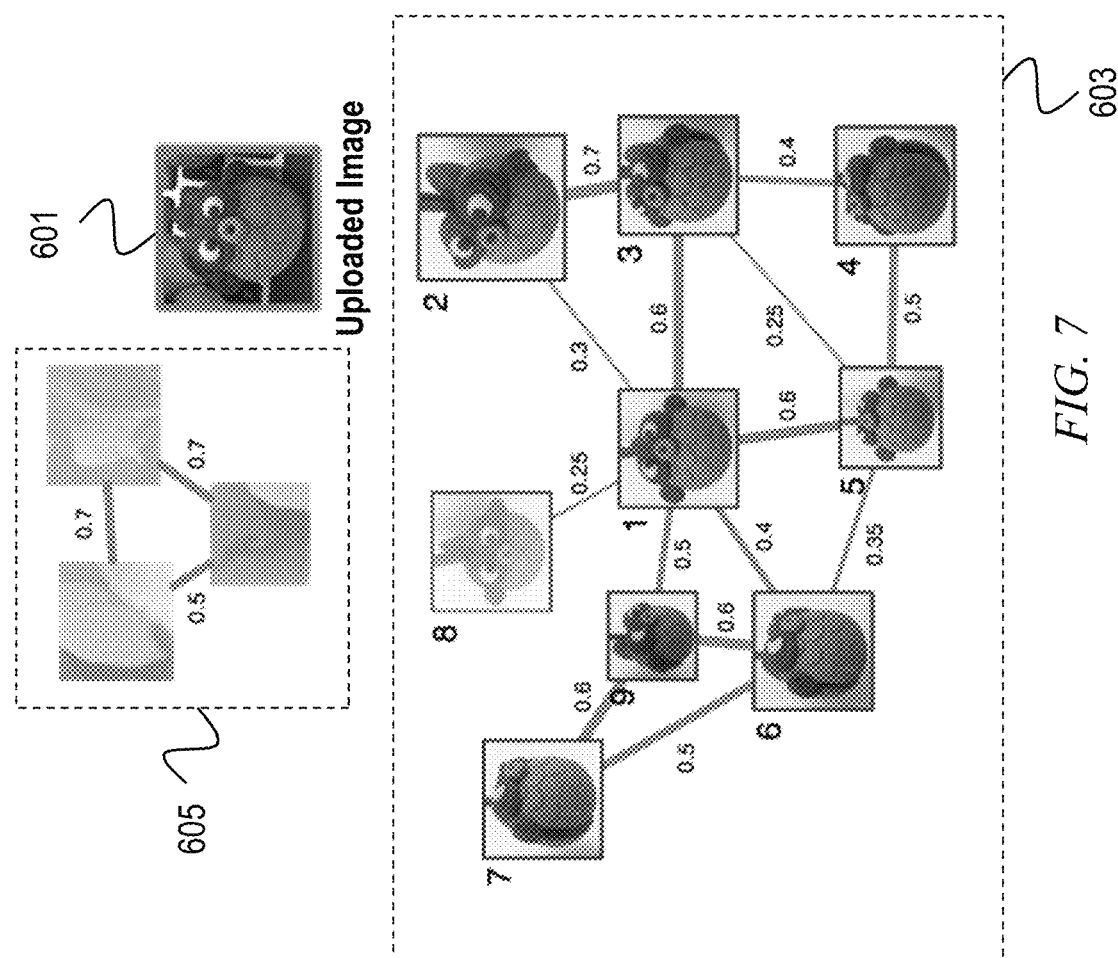
FIG. 7 depicts building a reference image graph (RIG), according to an embodiment of the present invention.

FIG. 7 shows exemplary steps in building a RIG. Find RIGs with feature vectors similar to the uploaded image 601. Here, there are two existing RIGs, 603 and 605. Calculate the similarity between the uploaded image 601 and reference images in the existing RIGs. For example, compare the uploaded image 601 to a characteristic image for RIG 603 and to another characteristic image for RIG 605. Consider adding a new node to the RIG with the best matching score between image 601 and the characteristic image for that RIG. If the uploaded image 601 is identical or very similar to images in the selected RIG, discard it since it will not provide new pertinent information. If the uploaded image is quite dis-similar (discussed below) to the images in the selected RIG, create a new RIG. Otherwise, add the uploaded image to the selected RIG. In the non-limiting example of FIG. 7, uploaded image 601 is similar to images in RIG 603 but not to those in RIG 605.

The above-mentioned characteristic or representative image(s) can be, for example, the image in the center of the graph (e.g., image 1 is characteristic image for RIG 603). Alternatively, an average feature vector of all images in the group can be calculated and used as the characteristic or representative feature vector. In another aspect, the principal feature vector of the images can be calculated and used as the representative image. In one or more embodiments, compare the candidate 601 to the representative or characteristic image for each RIG. Find the highest scoring RIG. Then, carry out a fine-grained search within that RIG. The new input image is added to only one RIG, in one or more embodiments. Note that a characteristic or representative image which is used to typify a RIG should be distinguished from the concept of "reference" images which refers to the fact that only reference images, and not all images, are included in the RIG (i.e., excessively similar images are discarded).

Figure 8:
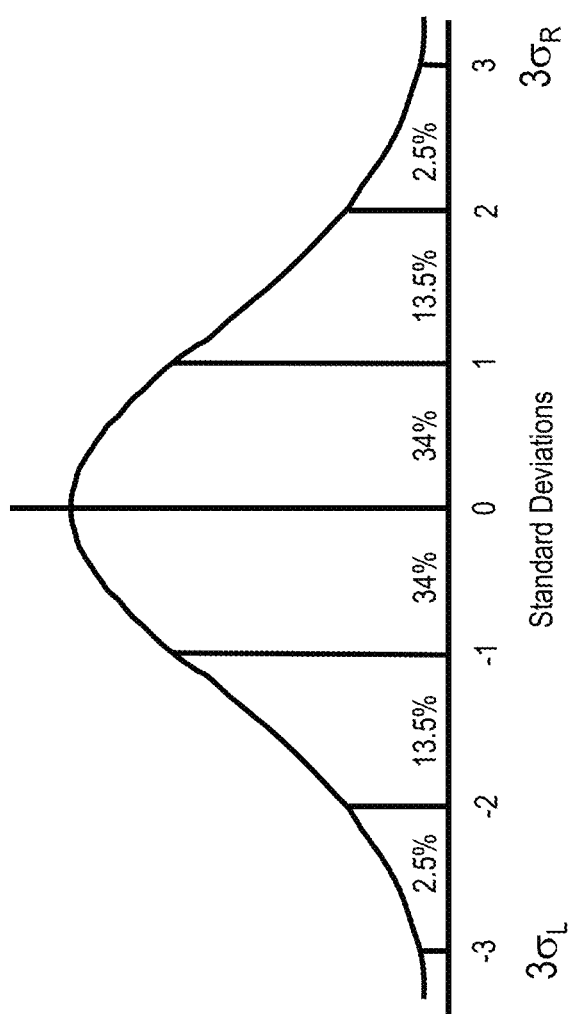
FIG. 8 depicts use of a Gaussian distribution to compute dis-similarity, according to an embodiment of the present invention.

By way of review, in one or more embodiments, there are two or more existing RIGs in a database (e.g., 603, 605). There is an image 601 coming in and it is desired to decide what to do with the image 601. First, compare uploaded image 601 to the single characteristic image for each RIG. Then, within the RIG that is closest, use criteria discussed elsewhere herein to see if image 601 should be added to that RIG, discarded, or used to begin a new RIG. Once it is determined that an image should putatively be added to a given RIG, proceed image-by-image through that RIG and see if the candidate image is too close (in which case discard) or else add the image and calculate edge weights to add to the graph. In one or more embodiments, edge weights are taken as the similarity between images, calculated by feature vector or geometric similarity, for example. When a new input image is to be added to a RIG, carry out a similarity calculation between the images of the RIG—the similarity score is the weight of connection. Group each image with other images it is most similar to and add edges to those where it has some minimum (threshold similarity); else, do not add an edge. A Gaussian distribution as shown in FIG. 8 can be used to decide on the threshold in one or more embodiments. By way of illustration, not that image 1 in RIG 603 has edges to images 2, 3, 5, 6, 9, and 8 only, with respective weights 0.3, 0.6, 0.6, 0.4, 0.5, and 0.25.

Referring to FIG. 8, dis-similarity can be calculated, for example, as follows. Given an image i, determine if i should be used to build a new RIG or evolve an existing RIG. For each RIG, discard image i if $S_{ij} < 3 \sigma_L$. This implies low similarity—check the other RIGs, and if none are similar, build a new RIG. Furthermore, for each RIG, discard image i if $S_{ij} > 3\sigma_R$. This implies high similarity such that only limited new information would be provided by adding i to the RIG. Note that $S_{ij}$ is the similarity between image i and image j, where j is one of images in a RIG.

Acceptance probability f(x, μ, σ) can be determined as set forth below. The Gaussian distribution curve of FIG. 8 is broken into standard deviations. For multiple images in a RIG, calculate the feature vector of each image, and use that to calculate the mean feature vector and the variations of the feature vectors. In this case, the mean value of the Gaussian and the deviation of the Gaussian are of interest. Use images in the RIG to calculate the mean and variation and use the Gaussian distribution to take the threshold. Gaussian distribution is used to decide higher and lower thresholds. Thus:

$$f(x,\mu,\sigma)=(\sigma\sqrt{2\pi})^{-1}\exp(-(x-\mu)^2/2\sigma^2)$$

$\mu=\alpha(|RIG_i|)^{-1}\Sigma_{j\in RIGi}S_{xj}-(1-\alpha)(\Sigma_{j'=i}|RIG_{j'}|)^{-1}\cdot\Sigma_{j'}$, not contained in RIGi$S_{xj'}$ (here, the mean of Gaussian distribution is the mean feature vector of all images in a RIG).

$\sigma=\beta|(|RIG_i|)^{-1}\Sigma_{j\in RIGi}S_{xj}-(\Sigma_{j'=i}|RIG_{j'}|)^{-1}\cdot\Sigma_{j'}$, not contained in RIGi$S_{xj'}$| (here, the variation of Gaussian distribution is the variation of feature vectors of all images in a RIG).

Assume that image i is chosen to be included in a RIG. Rank the images in the RIG in descending order according to the similarity to image i. Higher ranked images have a higher similarity. Add neighbors to image i from the ranked neighbors and keep the local clustering coefficient.

Figure 9:
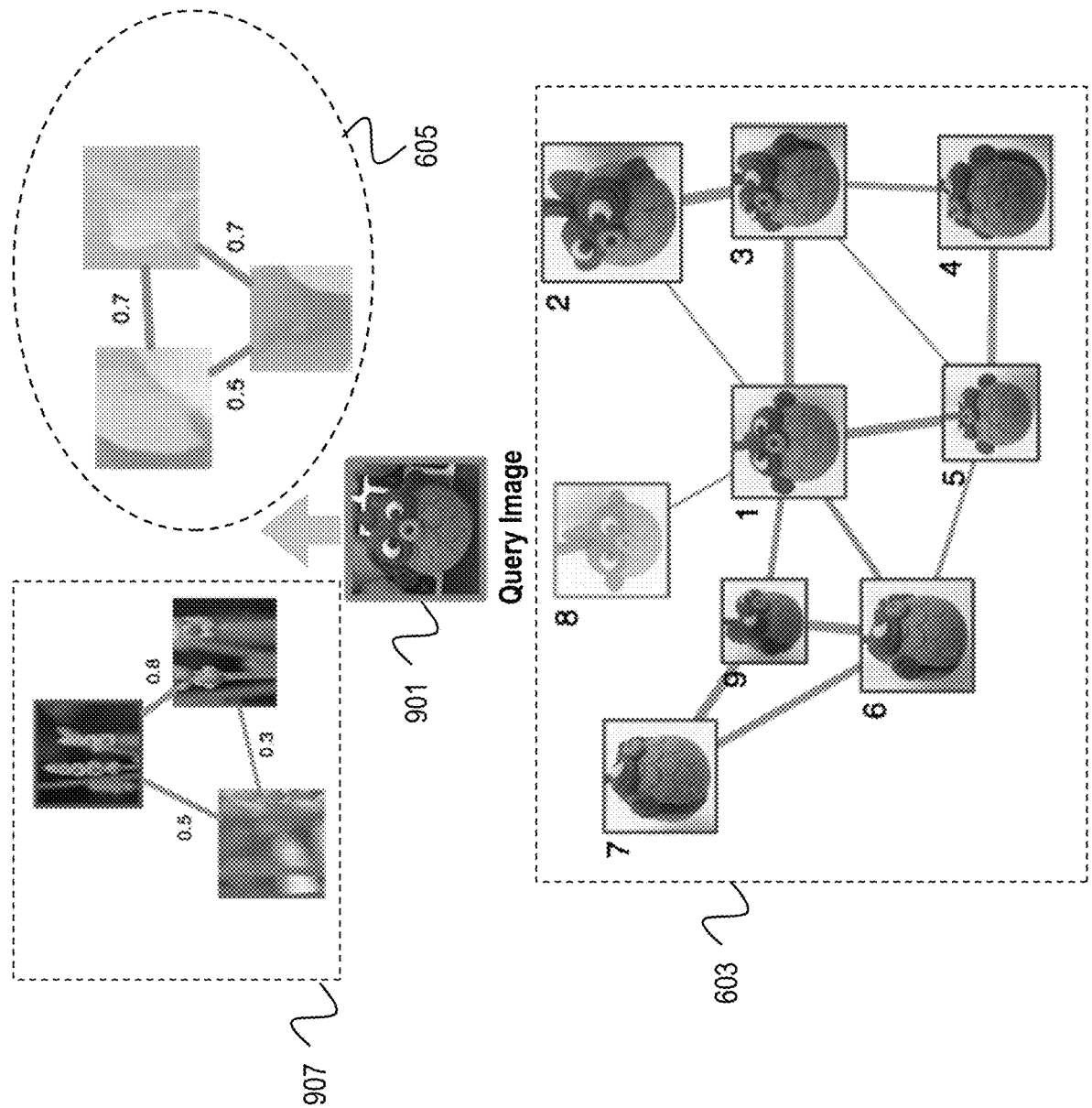
FIG. 9 depicts image querying in a reference image graph (RIG), according to an embodiment of the present invention.

Considering steps in building a RIG and carrying out an image query in RIGs, refer to FIG. 9. Select RIGs in the database with feature vectors similar to that of the query image 901. Here, there are three RIGs, namely, 603, 605, and 907. Only RIG 603 has images similar to the query image 901. Furthermore in this regard, in the example, the database has three different RIGs: 603, 605, and 907. Compare the query image 901 to a characteristic image for each RIG and find that the only good match is with RIG. 603. Select a query entry in a RIG; e.g., an image with high centrality such as the image 1 in the graph center of RIG 603. In an exemplary query procedure, carry out graph traversal for image-query, and stop the query at a local maximum. Regarding the "local maximum," it is not efficient to compare the query image naively to each image in a RIG. Instead, one or more embodiments use the local maximum technique to reduce the number of comparisons. Start with image 1 (the representative image). Image 1 has five connections. See which of the images connected to image 1 has the highest score to the query image. Suppose it is image 3. Then, see which of the images connected to image 3 has the highest score to the query image. Keep doing this until the score goes down; the last image before the score went down is the closest. This graph traversal technique avoids "brute force." One or more embodiments undertake multiple queries; e.g., parallel queries to different RIGs.

Figure 10:
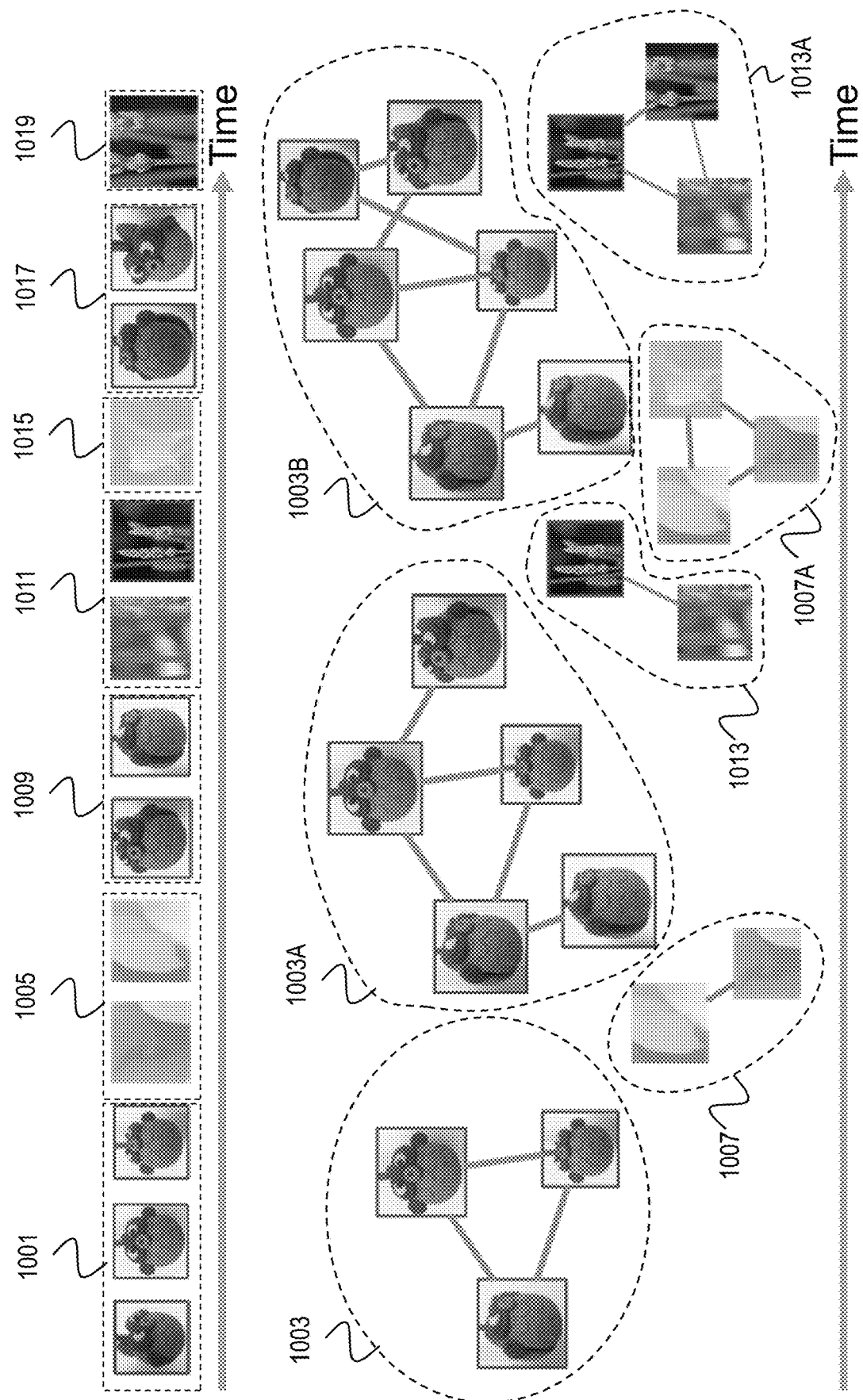
FIGS. 10-14 present non-limiting exemplary simulation results, according to an embodiment of the present invention.

FIG. 10 shows exemplary simulation results. The top of the figure shows thirteen images that were added to the database, in the chronological order they were added—the earliest addition at left, the latest addition at right. The bottom of the figure shows the RIGs that were built online as a function of time—the earliest at left, the latest at right. In particular, first, the three images 1001 were added to the database; then, RIG 1003 was built from them. Next, the two images 1005 were added to the database; then, RIG 1007 was built from them. Next, the two images 1009 were added to the database; then, they were added to RIG 1003 as seen at 1003A. Next, the two images 1011 were added to the database; then, RIG 1013 was built from them. Next, image 1015 was added to the database; then, it was added to RIG 1007 as seen at 1007A. Next, the two images 1017 were added to the database; then, they were added to the previously-expanded RIG 1003 shown at 1003A as seen at 1003B. Finally, image 1019 was added to the database; then, it was added to RIG 1013 as seen at 1013A.

Figure 11:
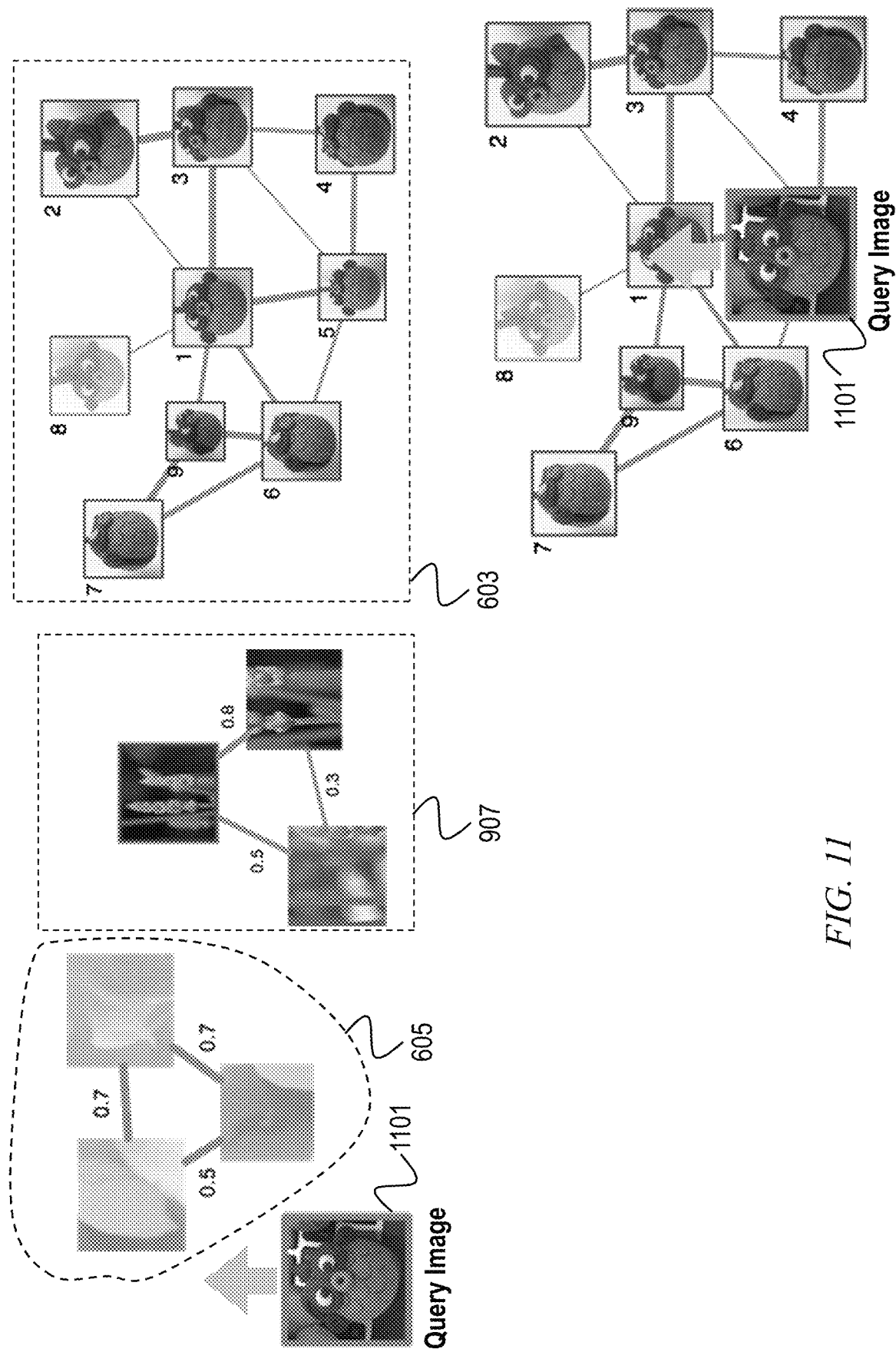

FIG. 11 shows additional simulation results; in particular, of an online image query based on query image 1101. First, select one or more appropriate RIGs in the database. Here, there are three RIGs, namely, 603, 605, and 907. Select based on a characteristic image for each RIG; e.g., the image with the highest centrality (same as discussed above for purposes of graph construction). Within the selected RIG, undertake graph traversal on the selected RIG 603 for image query with query image 1101, as seen in the lower right-hand corner of FIG. 11. That is to say, compare query image 1101 to the central or characteristic image in each RIG and find the closest RIG; then, within the RIG, undertake graph traversal. The query process is somewhat similar to the graph construction process discussed above.

Figure 12:
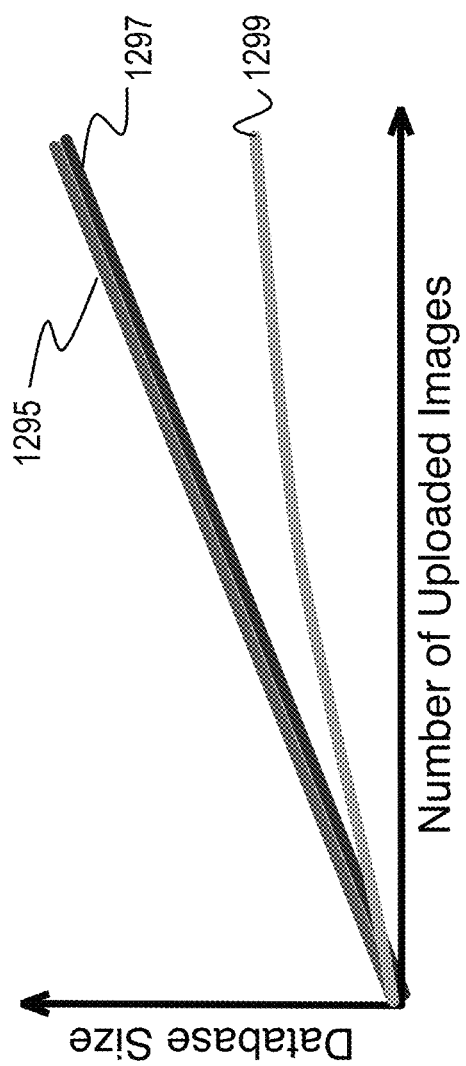

FIG. 12 shows database size reduction that can be achieved using an embodiment of the invention (curve 1299) versus the prior art feature vector (curve 1297) and time stamp (curve 1295) approaches. The database size is plotted against the number of uploaded images. By only preserving reference images, the database size is reduced as compared to prior art approaches, and thus fewer query tries will be needed.

Figure 13:
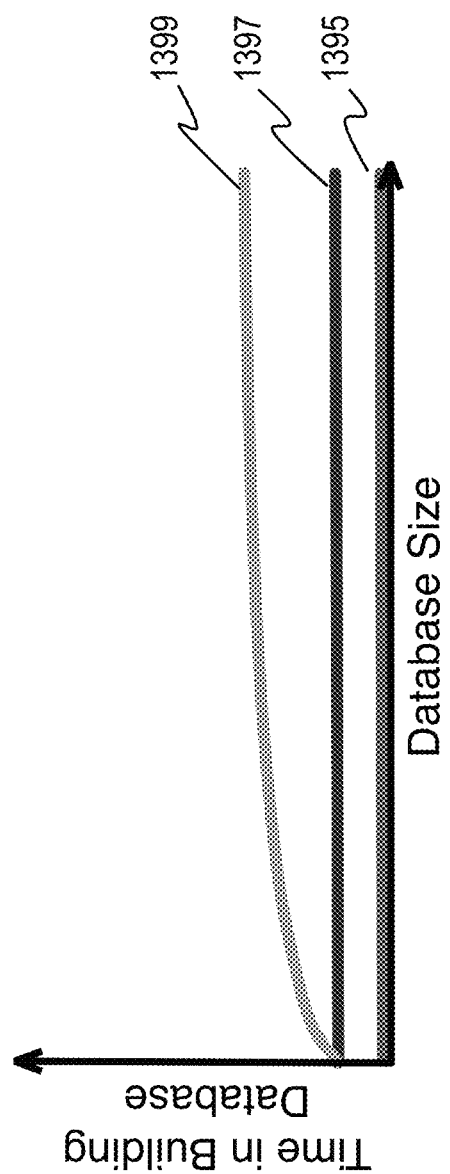

FIG. 13 shows additional effort to build the database that may be required when using an embodiment of the invention (curve 1399) versus the prior art feature vector (curve 1397) and time stamp (curve 1395) approaches. The time required to build the database is plotted against the database size. More effort is needed to build the database as compared to the prior art, in order to calculate the image similarity—advantageously, the number of images in the RIG does not increase linearly. This is so because one or more embodiments do not keep every image, but rather throw away the images that are very similar to what is already there. Thus, linear growth in the number of images in the RIG is not observed, because one or more embodiments only select images that impart useful information. This keeps the size of RIG from getting too big.

Figure 14:
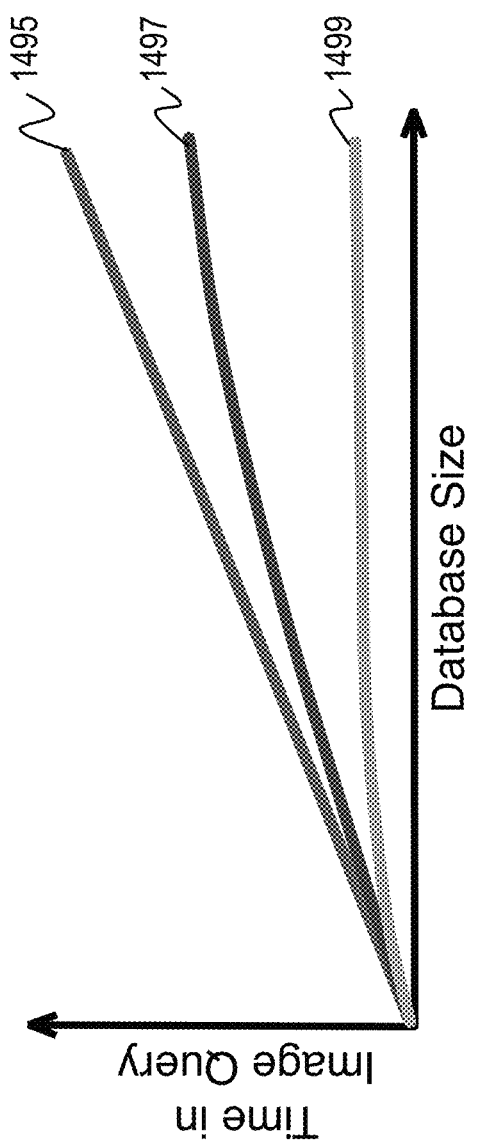

FIG. 14 shows increased query speed that can be achieved using an embodiment of the invention (curve 1499) versus the prior art feature vector (curve 1497) and time stamp (curve 1495) approaches. The time required for an image query is plotted against the database size. By only querying some RIGs, and stopping the query at a local maximum, increased speed is obtained. Note that the non-limiting examples of FIGS. 12-14 were obtained with a simulation having 5,978 images, 5,978 vertices, 89,206 edges in Cent OS 6.3 on an IBM Blade Center multi-socket multicore server. Other results could be obtained in other embodiments.

Thus, one or more embodiments provide graph-based online image querying for big data applications and the like. In one or more embodiments, new images are frequently uploaded to the database; e.g., every second. RIGs are built online and a dynamic database structure is employed. To reduce the number of query tries, only reference images are reserved. One or more embodiments efficiently provide a real-time and immediate response to an image-query, wherein only the RIGs with feature vector(s) similar to the query image's are queried, and where graph traversal in a RIG is employed to avoid comprehensive query. One or more embodiments permit parallelism, i.e., multiple queries at the same time, wherein a graph-based structure is suitable for multiple input queries. Different RIGs could be stored in different tables. Then, input images may queried in the different tables simultaneously.

One or more embodiments thus provide a Method and/or System for Online building of one or more RIGs, with subsequent image querying. Image relationships are recorded in a graph structure, with the RIG as the basic component in the database. RIGs are built online (i.e., in real time as new images are added to the database). A RIG includes a group of images with similar feature vectors. Only reference images are kept in the database. Reference images with image similarity are connected by graph edges. Image queries are then undertaken on the graph-based database that has been organized into RIGs. Those RIGs with feature vectors similar to the query image's are queried. Image-query is undertaken by graph traversal (as discussed elsewhere herein) instead of comprehensive search, in one or more embodiments. A graph structure is employed which is suitable for parallel queries.

In one or more embodiments, construct a Reference Image Graph (RIG) using the online selected reference images, where the image similarity is naturally expressed. Use a graph traversal based approach for image query, so as to avoid comprehensive search. Only preserve representative reference images in the graph to reduce the database size (graph size) and effectively support concurrent queries. Check newly captured images in the database and dynamically update the RIG for improving future query accuracy.

Compared to existing systems, one advantage is that embodiments of the invention enable real time image querying to be carried out on commodity infrastructures (i.e., ordinary servers rather than supercomputers), with ability to handle dynamics of the underlying problems and concurrent operations. These features result in suitability for various "big data" applications. Of course, high-speed machines such as supercomputers could be employed if desired.

One or more embodiments provide techniques that establish a reference image database as a graph representation. Instead of naively comparing against each reference image, one or more embodiments converts query-image comparison as a sub-graph traversal in the reference image graph.

One or more embodiments only utilize the graph as a data organization method for representing reference images. The reference images form a graph according to their similarities. However, the structural features of the formed graph are neither analyzed nor utilized in in one or more embodiments. One or more embodiments, instead of focusing on graph structural features, use the graph as a data representation method.

One or more embodiments require no geographic location information with the images. In one or more embodiments, construct a graph representing the similarity relationship between reference images. The comparison of the query image is converted into a graph traversal operation. The comparison complexity is significantly reduced in one or more embodiments because the matching outcome can be achieved after only a sub-graph traversal.

One or more embodiments target on the comparison between multiple query images and a large amount of reference images. By utilizing a graph-based method, one or more embodiments significantly reduce the number of reference images that need to be compared.

In one or more embodiments, the incoming query is an image, which needs to be compared with reference images. One or more embodiments construct the reference images as a similarity graph and then convert the query into a graph traversal operation to save image comparison time. One or more embodiments do not employ result caching.

Thus, one or more embodiments employ a Reference Image Graph (RIG) to improve the image query speed. The RIG of one or more embodiments uses groups of image graphs to efficiently hit the target image.

Thus, by way of review and summary, it will be appreciated that image query is the kernel computation for many emerging applications, which finds applications in various domains. For example, in security, it is used for analysis of surveillance videos; in mobile apps, it is used for scene recognition on smart phones; in cloud computing, it is employed for image and/or video search applications. Despite its popularity, there are several challenges that limit the use of image querying in big data applications. Since new images can be uploaded to a database very frequently (e.g., every second), any image repository incapable of handling real time updates does not meet the requirements. Building an online image database requires dynamic modification of the structure of the image database, but this is not easy to achieve if the images are not organized properly. Besides, the real-time requirement to image query leads to reduction of the number of image matchings and decreasing the computation time of image querying; while increasing the hit rates of image querying. Therefore, additional solutions are required to organize and/or manage the images into a graph in a big repository for supporting efficient image querying.

One or more embodiments construct a Reference Image Graph (RIG) using the online selected reference images, where the image similarity is naturally expressed. One or more embodiments use a graph traversal based approach for image query, so that a comprehensive search can be avoided. Furthermore, one or more embodiments only preserve representative reference images in the graph to reduce the database size (graph size) and effectively support concurrent queries. Yet further, one or more embodiments check newly captured images in the database and dynamically update the RIG for improving future query accuracy. One or more embodiments advantageously enable real time image querying on commodity infrastructures, which handles dynamics of the underlying problems and allows concurrent operations. These features warrant its suitability in various big data applications.

It will thus be appreciated that aspects of the invention in include: (i) how to construct an image graph and (ii) image based querying. In a non-limiting example, both parts are computed in a cloud environment as depicted in FIGS. 1-3. For example, the user logs into a cloud environment from a device such as 54A, 54B, or 54C and uploads images to the cloud to build the graph and/or search in the cloud. One or more embodiments are thus implemented in a database app running in the workloads layer 66.

Figure 15:
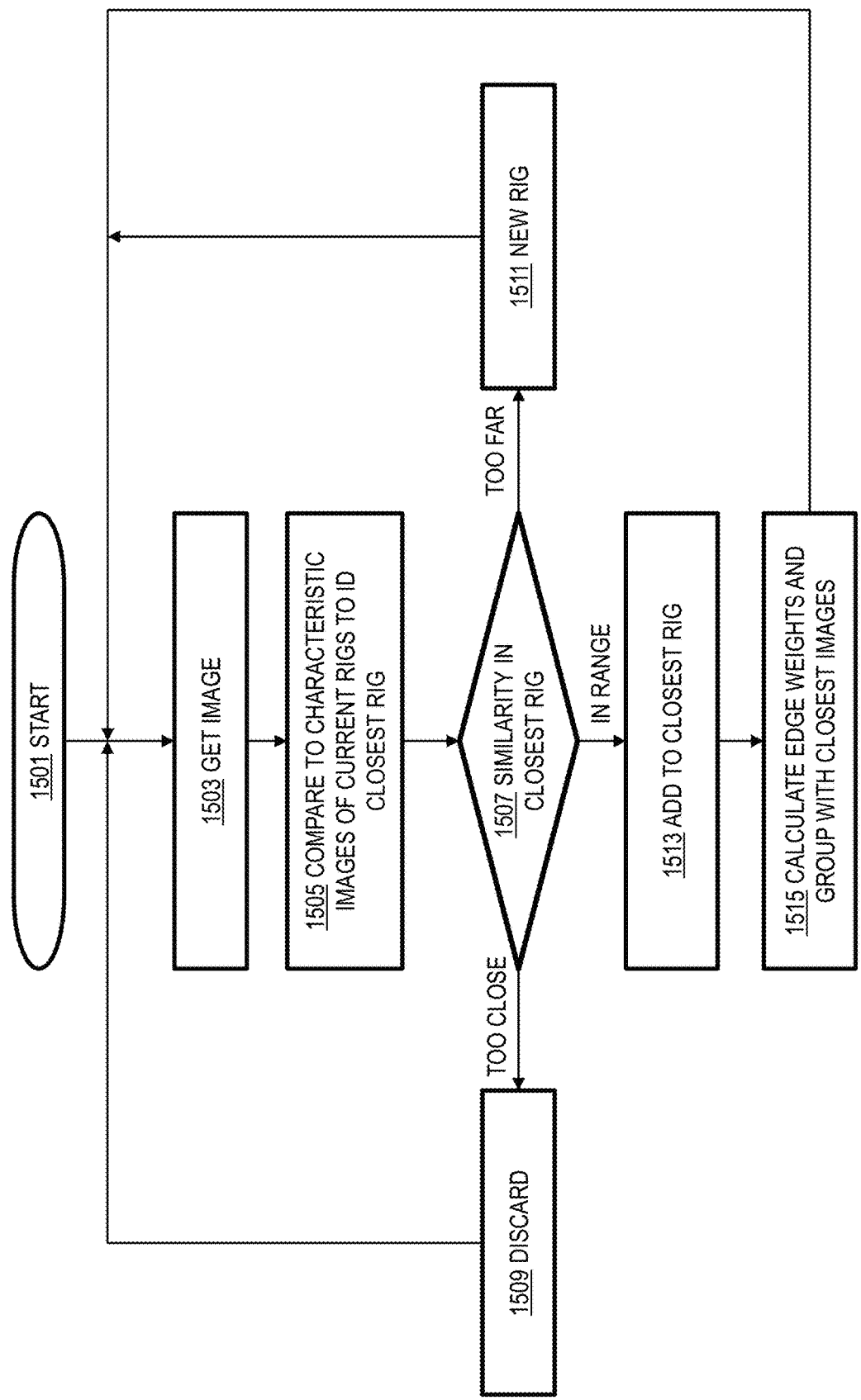
FIG. 15 depicts building graphs, according to an embodiment of the present invention.
Figure 16:
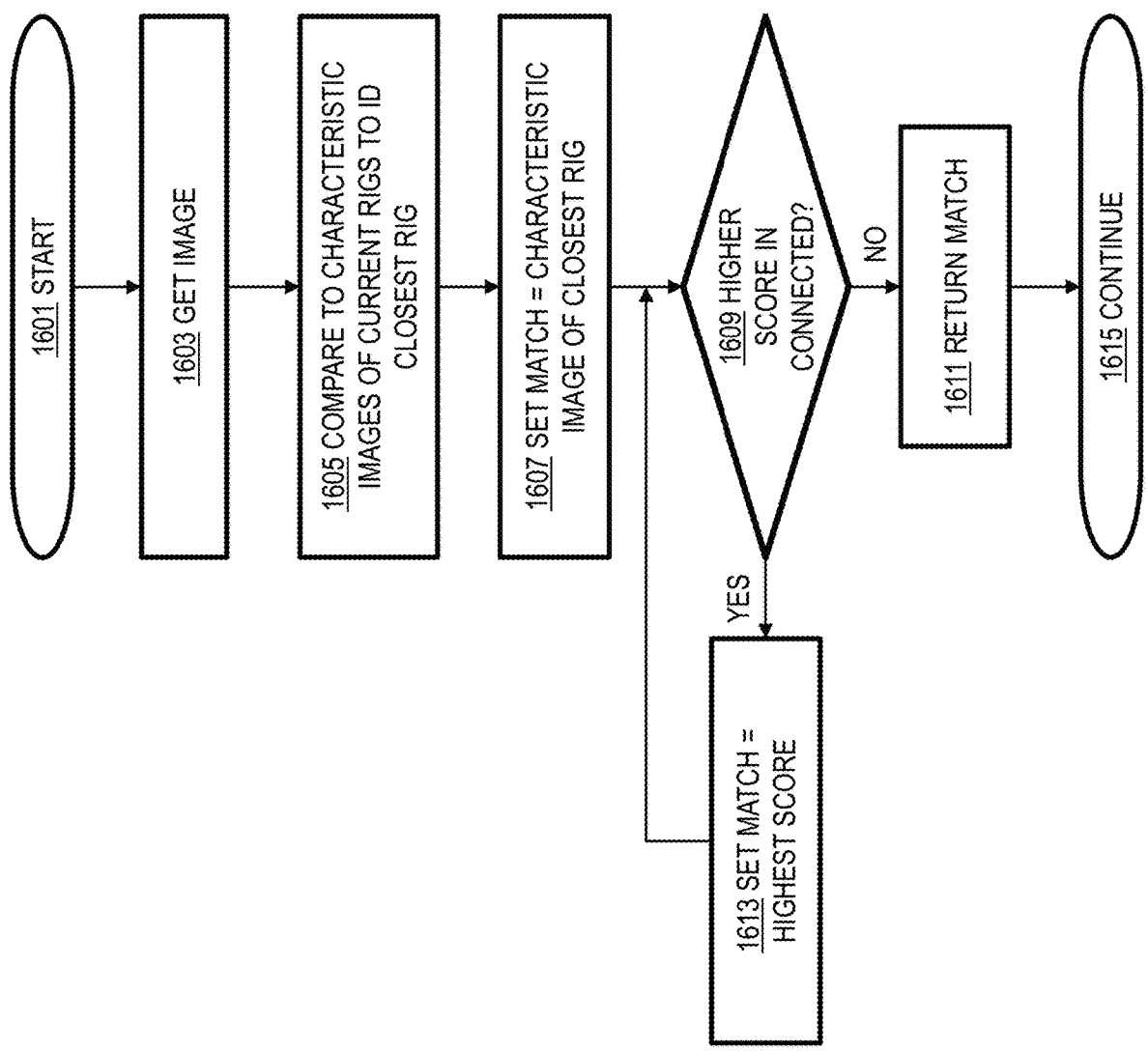
FIG. 16 depicts querying graphs, according to an embodiment of the present invention.

Given the discussion thus far, and with reference to FIGS. 15 and 16, it will be appreciated that, in general terms, an exemplary method, which begins at 1601, includes obtaining a query image, as at 1603; and, in a database including a plurality of reference image graphs (e.g., 605, 907, 603), identifying at least one of the reference image graphs (e.g., 603) with feature vectors similar to the query image, as in 1605. A further step includes carrying out image querying by graph traversal on the at least one of the reference image graphs 603 with the feature vectors similar to the query image (e.g. steps 1607, 1609, 1613). An even further step 1611 includes returning, as a response to the query image, an image from the at least one of the reference image graphs having a highest matching score in the graph traversal.

One or more embodiments further include building the database as in FIG. 15. For example, after beginning at 1501, building the database includes step 1503, obtaining a first uploaded image as a candidate to be added to the database; and eliminating the first uploaded image from consideration for addition to a given one of the reference image graphs to which it is insufficiently similar (i.e., ID closest RIG in 1505). A further step includes adding the first uploaded image to another given one of the reference image graphs to which it is sufficiently similar, but not so similar that it does not convey useful information, as per the "in range" branch of decision block 1507, at 1513.

In one or more embodiments, building the database further includes obtaining a second uploaded image as a candidate to be added to the database; determining that the second uploaded image is insufficiently similar to any of the existing reference image graphs; and beginning a new reference image graph as at 1511 with the second uploaded image, responsive to the determining.

In one or more embodiments, building the database further includes obtaining a third uploaded image as a candidate to be added to the database; determining that the third uploaded image is so highly similar to at least one of the existing reference image graphs that it would not convey useful information; and, as at 1509, responsive to the determining that the third uploaded image would not convey useful information, discarding the third uploaded image.

When the image is added to a RIG, the edge weights are calculated and the new image is grouped with the images it is most similar to, as per 1515.

One or more embodiments identify a characteristic image for each of the reference image graphs, such that the identifying of the at least one of the reference image graphs with feature vectors similar to the query image includes comparing the query image to each characteristic image for each of the reference image graphs. The characteristic image can be, for example, a central image; a calculated average feature vector of all images in each of the reference image graphs; or a principal feature vector of images in each of the reference image graphs.

In FIG. 16, the graph traversal includes comparing the query image to each image in the at least one of the reference image graphs which is connected to the characteristic image of the at least one of the reference image graphs to determine which of the connected images has a highest score to the query image; and repeating the comparing step for each image in the at least one of the reference image graphs which is connected to the connected image having a highest score to the query image, until the score declines, wherein the connected image having the highest score prior to the decline includes the image from the at least one of the reference image graphs having the highest matching score in the graph traversal. This is shown in steps 1607-1613. Initially at 1607 set the "match" as the characteristic image of the RIG. Look at all the images connected to that image, and see if any has a higher score, as in block 1609. If so, set that image as the "match" in 1613 and examine all the images connected to it, repeating block 1609. Now look at all the images connected to that match, and see if any of them have a higher score; when a higher score is not achieved, return the match as the response to the query, in 1611. Processing continues at 1615.

As noted, one or more embodiments can be implemented in a cloud computing environment. For example, the query image is obtained at a database application executing in a workload layer 66 of a cloud computing environment, via a network connection from a remote computing device such as 54A, 54B, or 54C. The identifying and carrying out image querying steps are carried out by the database application executing in the workload layer of the cloud computing environment. The returning of the image is carried out by the database application executing in the workload layer of the cloud computing environment, sending, via the network connection, to the remote computing device, the image from the at least one of the reference image graphs having the highest matching score in the graph traversal.

In another aspect, an exemplary system includes a plurality of hardware servers (e.g. as per layer 60); a database application executing in a workload layer 66 on top of the plurality of hardware servers; and a network interface in data communication with the database application (e.g., as described with regard to FIG. 1 in communication with 54A, 54B, or 54C). The database app carried out any one, some, or all of the steps described.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-3 and accompanying text. Consider, e.g., a database app in layer 66.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described.

The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
obtaining a query image;
in a database comprising a plurality of reference image graphs, identifying at least one of said reference image graphs with feature vectors similar to said query image, each reference image graph comprising two or more images having similar feature vectors, each of said two or more images being connected to at least one other of said two or more images based on an image similarity;
carrying out image querying by graph traversal on said at least one of said reference image graphs with said feature vectors similar to said query image;
returning, as a response to said query image, an image from said at least one of said reference image graphs having a highest matching score in said graph traversal; and calculating a mean feature vector and variations of the feature vectors; using said mean feature vector, said variations of said feature vectors, and a Gaussian distribution to determine a lower similarity threshold and a higher similarity threshold; and building said database using said lower similarity threshold and said higher similarity threshold.

2. The method of claim 1, wherein building said database comprises:
obtaining a first uploaded image as a candidate to be added to said database;
comparing said first uploaded image to existing reference image graphs;
eliminating said first uploaded image from consideration for addition to a given one of said reference image graphs to which it is insufficiently similar; and
adding said first uploaded image to another given one of said reference image graphs to which it is sufficiently similar, but not so similar that it does not convey useful information.

3. The method of claim 2, wherein building said database further comprises:
obtaining a second uploaded image as a candidate to be added to said database;
determining that said second uploaded image is insufficiently similar to any of said existing reference image graphs; and
beginning a new reference image graph with said second uploaded image, responsive to said determining.

4. The method of claim 3, wherein building said database further comprises:
obtaining a third uploaded image as a candidate to be added to said database;
determining that said third uploaded image is so highly similar to at least one of said existing reference image graphs that it would not convey useful information; and
responsive to said determining that said third uploaded image would not convey useful information, discarding said third uploaded image.

5. The method of claim 1, further comprising identifying a characteristic image for each of said reference image graphs, wherein said identifying of said at least one of said reference image graphs with feature vectors similar to said query image comprises comparing said query image to each characteristic image for each of said reference image graphs.

6. The method of claim 5, wherein said identifying a characteristic image for each of said reference image graphs comprises identifying a central image for each of said reference image graphs.

7. The method of claim 5, wherein said identifying a characteristic image for each of said reference image graphs comprises calculating an average feature vector of all images in each of said reference image graphs.

8. The method of claim 5, wherein said identifying a characteristic image for each of said reference image graphs comprises calculating a principal feature vector of images in each of said reference image graphs.

9. The method of claim 5, wherein said graph traversal comprises:
comparing said query image to each image in said at least one of said reference image graphs which is connected to said characteristic image of said at least one of said reference image graphs to determine which of said connected images has a highest score to said query image; and
repeating said comparing step for each image in said at least one of said reference image graphs which is connected to said connected image having a highest score to said query image, until a corresponding score declines, wherein said connected image having said highest score prior to said decline comprises said image from said at least one of said reference image graphs having said highest matching score in said graph traversal.

10. The method of claim 1, wherein:
said query image is obtained at a database application executing in a workload layer of a cloud computing environment, via a network connection from a remote computing device;
said identifying and carrying out image querying steps are carried out by said database application executing in said workload layer of said cloud computing environment; and
said returning of said image is carried out by said database application executing in said workload layer of said cloud computing environment, sending, via said network connection, to said remote computing device, said image from said at least one of said reference image graphs having said highest matching score in said graph traversal.

11. A system comprising:
a plurality of hardware servers;
a database application executing in a workload layer on top of said plurality of hardware servers; and
a network interface in data communication with said database application;
wherein:
said database application obtains a query image over said network interface;
said database application comprises a plurality of reference image graphs, and identifies at least one of said reference image graphs with feature vectors similar to said query image, each reference image graph comprising two or more images having similar feature vectors, each of said two or more images being connected to at least one other of said two or more images based on an image similarity;
said database application carries out image querying by graph traversal on said at least one of said reference image graphs with said feature vectors similar to said query image; and
said database application returns, as a response to said query image, via said network interface, an image from said at least one of said reference image graphs having a highest matching score in said graph traversal;
wherein said database adds new images by:
obtaining a first uploaded image as a candidate to be added to said database;
comparing said first uploaded image to existing reference image graphs;
eliminating said first uploaded image from consideration for addition to a given one of said reference image graphs to which it is insufficiently similar; and
adding said first uploaded image to another given one of said reference image graphs to which it is sufficiently similar, but not so similar that it does not convey useful information.

12. The system of claim 11, wherein said database further adds new images by:
obtaining a second uploaded image as a candidate to be added to said database;
determining that said second uploaded image is insufficiently similar to any of said existing reference image graphs; and
beginning a new reference image graph with said second uploaded image, responsive to said determining.

13. The system of claim 12, wherein said database further adds new images by:
obtaining a third uploaded image as a candidate to be added to said database;
determining that said third uploaded image is so highly similar to at least one of said existing reference image graphs that it would not convey useful information; and
responsive to said determining that said third uploaded image would not convey useful information, discarding said third uploaded image.

14. A non-transitory computer readable medium comprising computer executable instructions which when executed by a computer cause the computer to perform the method of:
obtaining a query image;
in a database comprising a plurality of reference image graphs, identifying at least one of said reference image graphs with feature vectors similar to said query image, each reference image graph comprising two or more images having similar feature vectors, each of said two or more images being connected to at least one other of said two or more images based on an image similarity;
carrying out image querying by graph traversal on said at least one of said reference image graphs with said feature vectors similar to said query image; and
returning, as a response to said query image, an image from said at least one of said reference image graphs having a highest matching score in said graph traversal;
wherein said method further comprises calculating a mean feature vector and variations of the feature vectors; using said mean feature vector, said variations of said feature vectors, and a Gaussian distribution to determine a lower similarity threshold and a higher similarity threshold; and
building said database using said lower similarity threshold and said higher similarity threshold.

15. The non-transitory computer readable medium of claim 14, wherein said method step of building said database comprises:
obtaining a first uploaded image as a candidate to be added to said database;
comparing said first uploaded image to existing reference image graphs;
eliminating said first uploaded image from consideration for addition to a given one of said reference image graphs to which it is insufficiently similar; and adding said first uploaded image to another given one of said reference image graphs to which it is sufficiently similar, but not so similar that it does not convey useful information.

16. The non-transitory computer readable medium of claim 15, wherein said method step of building said database further comprises:

obtaining a second uploaded image as a candidate to be added to said database;

determining that said second uploaded image is insufficiently similar to any of said existing reference image graphs; and beginning a new reference image graph with said second uploaded image, responsive to said determining.

17. The non-transitory computer readable medium of claim 16, wherein said method step of building said database further comprises:

obtaining a third uploaded image as a candidate to be added to said database;

determining that said third uploaded image is so highly similar to at least one of said existing reference image graphs that it would not convey useful information; and responsive to said determining that said third uploaded image would not convey useful information, discarding said third uploaded image.

* * * * *